July 10, 1951
S. A. BERGMAN
2,559,703
PIPE LAYING CRADLE
Filed Dec. 24, 1949
2 Sheets-Sheet 2
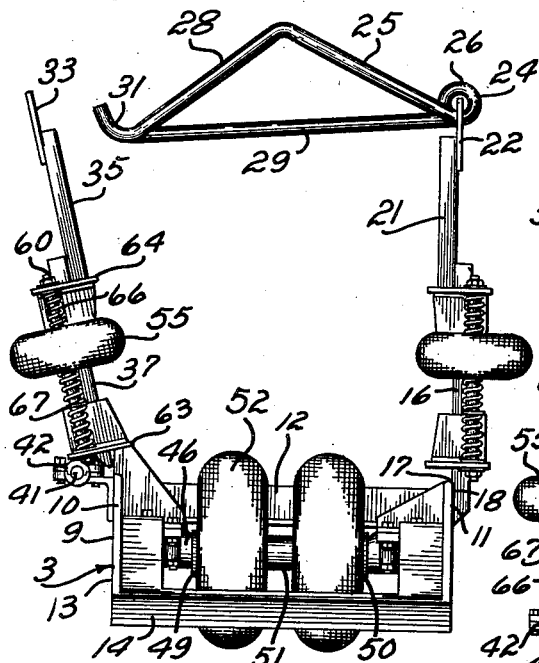
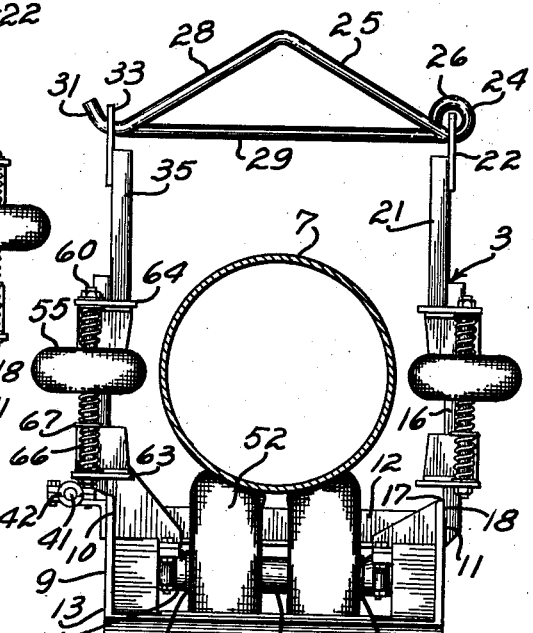
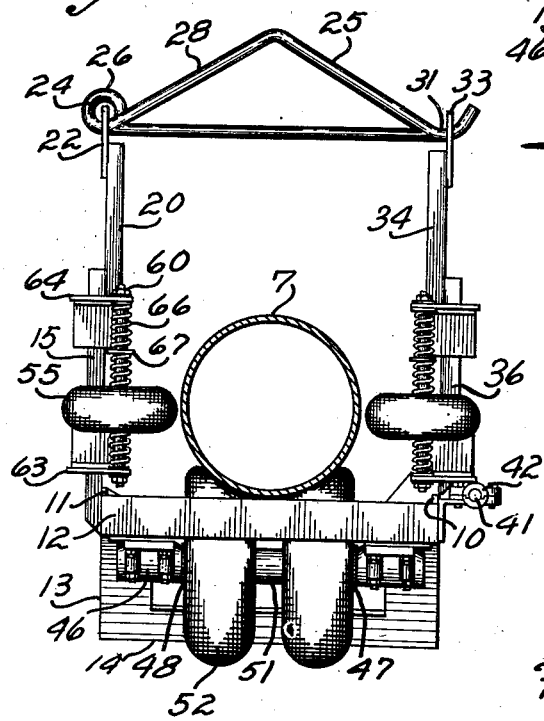
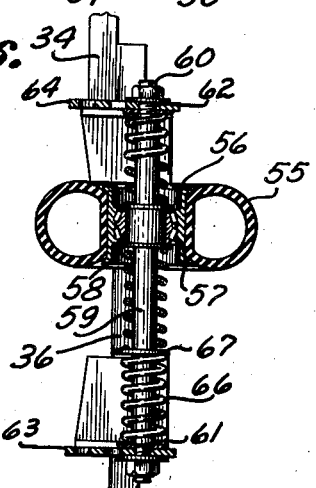
Inventor
Stephen A. Bergman
By Fishburn & Mullendore
Attorneys Patented July 10, 1951

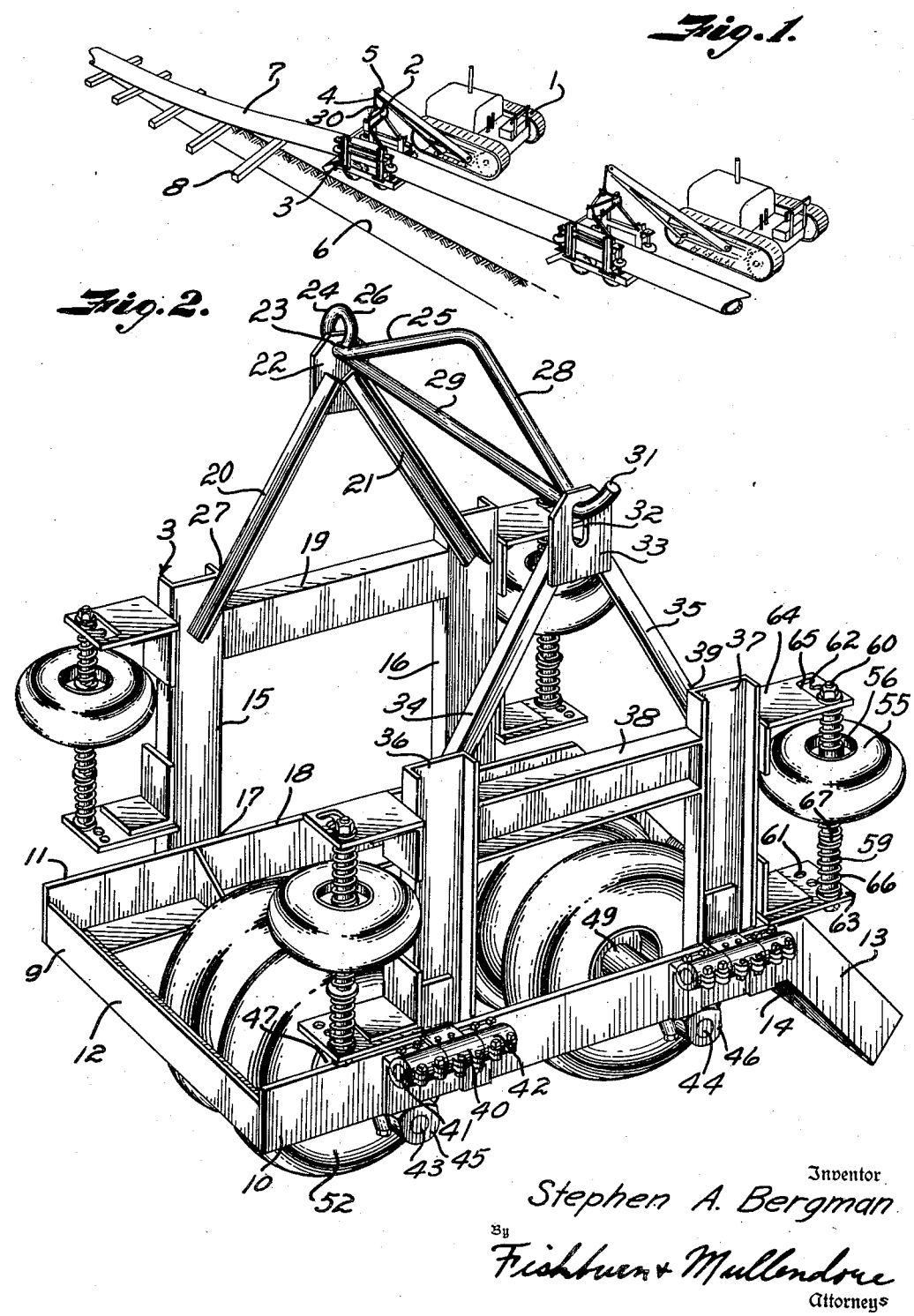

2,559,703

UNITED STATES PATENT OFFICE 2,559,703

PIPE LAYING CRADLE

Stephen A. Bergman, Mission, Kans., assignor to Panhandle Eastern Pipe Line Company, Kansas City, Mo., a corporation of Delaware Application December 24, 1949, Serial No. 134,937

8 Claims. (Cl. 214—1)

This invention relates to pipe laying apparatus and more particularly to a pipe laying cradle for engaging and supporting a string of connected pipe sections while painting, cleaning, wrapping and otherwise treating and handling said pipe and lowering said pipe into a previously dug trench.

In pipe line construction work it is usually customary to dig a trench and place timbers along the trench at spaced intervals. Pipe sections are placed on the ground near the trench and are lined up and their ends welded together forming a comparatively long string of welded pipe which is supported on the timbers. It is preferable to coat the string of pipe with asphalt, enamel and the like and also apply a wrapping material in a spiral on the pipe. Various materials and processes may be used in the coating and wrapping of pipe, however, it is important that the coating be impervious to water and the like as even small pin holes will permit electrolysis of the adjacent portion of the pipe. Therefore, it is important that when the pipe is lifted from the timbers and lowered to its final resting place in the trench, that the coating is not damaged or marred in any manner. The present pipe cradle is used to lift the pipe from the cross timbers and to move along the pipe with a tractor supporting same to continuously and gradually lower the pipe into the trench without marring of the coating on said pipe.

The objects of the present invention are to provide a pipe laying cradle which is portable and adapted for use with boom equipped tractors and similar vehicles which move longitudinally alongside of or over a trench whereby said cradle is moved therewith for supporting, handling and lowering comparatively long sections of pipe into the trenches without marring or scraping the enamel or other coating on said pipe; to provide a pipe laying cradle with cushion members or rollers engaging and supporting the underside and sides of a portion of a string of pipe and movable longitudinally thereof in such a manner as to avoid injury to the pipe or protective coating which may have been applied thereto, said cushion rollers being the only members contacting the pipe; to provide a cradle with pneumatic or other cushioned rollers adapted to freely rotate on the cradle frame for rollingly engaging and supporting the pipe as the cradle moves longitudinally along the pipe; to provide a cradle with pipe engaging members the engaging portions of which automatically assume the contour of the pipe; to provide a cradle with resiliently and adjustably mounted cushion members to engage different sizes of pipe; to provide a cradle with hinged sling or tackle portions whereby said cradle may be opened and easily applied to the string of connected pipe and when so applied is positively held in closed supporting position on the pipe; and to provide a pipe laying cradle of sturdy construction that is economical to manufacture, and efficient in use for progressively rollingly supporting a pipe line during treating and lowering of same into a trench without marring the coating on said pipe.

In accomplishing these and other objects of the present invention I have provided improved details of structure, the preferred forms of which are illustrated in the accompanying drawings, wherein:

Fig. 1 is a perspective view of the pipe laying cradle in operation for supporting a pipe line during handling and lowering into a trench.

Fig. 2 is a perspective view of a pipe line cradle embodying the features of the present invention.

Fig. 3 is an end elevation of the cradle with the tackle portions released for opening to apply the cradle to a pipe line.

Fig. 4 is an end elevation of the pipe line cradle illustrating a pipe supported thereby.

Fig. 5 is an opposite end elevation of the pipe line cradle adjusted for accommodating a smaller size pipe than is shown in Fig. 4.

Fig. 6 is a detail sectional view through the adjustable mounting of the side cushion rollers of the pipe line cradle.

Referring more in detail to the drawings:

1 designates a tractor of conventional type having a boom 2 supporting a pipe cradle 3 embodying the features of the present invention. The cradle is supported by means of a cable 4 which passes over a pulley 5 and is reeled upon any suitable winch or the like carried by the tractor 1. The tractor moves alongside a trench 6 whereby the cradle lifts a string of pipe 7 from cross timbers 8 and gradually lowers the pipe into the trench as the tractors are moved therealong. The pipe line cradle comprises a frame 9 having longitudinal side members 10 and 11 formed of conventional structural shapes such as angle-iron. One end of the side members is preferably connected by a cross member 12 suitably secured thereto as by welding, and the other ends of said side members are provided with downwardly sloping extensions 13, the ends of which are connected by a cross member 14.

A pair of upright posts 15 and 16 have their lower ends secured as at 17 as by welding to the vertical flange 18 of the side member 11, said posts being intermediate the ends of said side member and spaced longitudinally thereon. The posts 15 and 16 extend upwardly from the side member 11 and are connected adjacent their upper ends by a brace member 19 to provide rigidity to said posts. Converging post extensions 20 and 21 have their lower ends suitably secured as by welding to the upper ends of the posts 15 and 16, said converging extensions having their adjacent upper ends connected by a gusset plate 22 having a portion extending above the ends of the converging extensions provided with an aperture 23 for receiving an end 24 of a link 25, the end preferably being formed in a loop or eye 26 to provide a swinging joint between the link and side frame structure 27 which is rigid with the frame 9. The link 25 includes an inverted V-portion 28 and a chord portion 29 to form a suitable structure adapted to be engaged by a hook 30 carried on the end of the cable 4 for supporting the cradle. The link is of suitable length to span the width of the frame 9 and the end opposite the eye is provided with a hook 31 adapted to extend through and engage in an aperture 32 of a gusset plate 33 suitably secured to the upper ends of converging extensions 34 and 35, the lower ends of which are secured to posts 36 and 37. The posts 36 and 37 are connected adjacent their upper ends by a brace member 38 which cooperates with the extensions and posts to form a rigid side frame 39. The lower ends of the posts 36 and 37 are provided with bearings 40 rotatably mounted on hinge pins 41, each of which is carried in spaced bracket members 42 secured to the side frame member 10. The posts 36 and 37 are arranged substantially identically with posts 15 and 16 as to longitudinal relationship with the frame 9, however, either or both of the upwardly extending side frame structures 27 and 39 may be hinged to the frame 9 and connected at their upper ends by the link 25 whereby when disconnected the side frame may be opened and the frame applied to a string of pipe intermediate the ends thereof to locate the pipe between the side frames and between the frame 9 and the link 25.

Spaced shafts 43 and 44 extend transversely of the frame 9 and have their ends supported in pillow blocks 45 and 46 secured to the side members 10 and 11. The shaft 43 is preferably arranged substantially in alignment with the lower ends of the posts 15 and 36 and the shaft 44 substantially in alignment with the lower ends of the posts 16 and 37. Located on the respective shafts 43 and 44 and suitably keyed thereto are spaced hubs 47 and 48 and 49 and 50 respectively, suitable spacers 51 being arranged between the hubs to eliminate possibility of lateral movement thereof during rotation of the shaft in the pillow blocks 45 and 46. Suitable cushioning members 52, such as pneumatic tires, are mounted on each of the hubs 47, 48, 49 and 50 to provide pairs of resilient cushioning members adapted to engage the underneath face of a string of pipe 7 to support same. The cushioning members or pneumatic tires are sufficiently compressible to conform to the shape of the portion of the pipe engaged thereby, whereby the spaced cushions on the respective shafts form troughs for the pipe and the rotatable mounting of the shafts 43 and 44 in the pillow blocks 45 and 46 provides a rolling engagement between the cushioning members and the pipe, permitting movement of the cradle longitudinally of said pipe without marring the same. Also the compressibility of the cushion members 52 and the spacing between same and the respective pairs permit the cradle to be used on various sized pipes without adjustment of the positioning of the cushioning members 52.

Lateral support for the pipe is provided by means of cushion rollers 55, such as pneumatic tires, adapted to be adjustably positioned to engage the sides of the pipe in the event of relative lateral movement between the pipe and the cradle frame members. The pneumatic rollers 55 are suitably carried on rims 56 rotatably mounted by antifriction bearings 57 on hubs 58 slidably mounted on shafts 59. The shafts 59 have threaded end portions 60 adapted to extend through apertures 61 and 62 in vertically spaced brackets 63 and 64 which are rigidly secured to the posts 15, 16, 36 and 37. The apertures 61 in the brackets 63 are preferably spaced holes slightly larger than the ends 60 of the shafts 59 and each aligns with an aperture 62 in the bracket 64, said apertures 62 preferably being in the form of notches located in the sides of slots 65 of such size that the shaft 59 may be moved therethrough to facilitate assembly and adjustment of the positioning of said shafts. Sleeved on the shafts 59 are a plurality of springs 66 having washers 67 arranged at each end of the respective springs, the springs 66 being of such length that by arranging same in various combinations at opposite ends of the hubs 58 will provide for resiliently supporting the cushioned rollers 55 at selected vertical positions relative to the pipe as illustrated in Figs. 4 and 5. Also by placing the ends 60 of the shafts 59 in selected aligned apertures 61 and 62 the relative transverse spacing of the cushioned rollers 55 may be adjusted. The shafts 59 are secured in adjusted position by means of nuts 68 threaded on the ends 60 and screwed down into tight engagement with the brackets 63 and 64.

In using a pipe cradle constructed as described, the nuts 68 are removed to permit removal of the shafts 59. The shafts are then reinserted through the slots 65, the cushioned rollers 55, the springs 66 and washers 67 assembled on said shaft according to the size of the pipe to be laid in the trench. The ends 60 of the shafts 59 are then positioned in the apertures 61 and 62 according to the size of said pipe and the nuts 68 applied to the ends 60 to secure the shafts 59 in selected position. The cradle is then moved to the string of pipe and the hook 31 released from the plate 33 whereby the link 25 and hinged side frame 39 may be swung apart for movement of the frame 9 with the cushion members 52 thereon under the string of pipe, whereby the axis of said pipe will lie in alignment with the spacing between the cushioned rollers 52. The frame is then raised until the cushioned rollers 52 engage the pipe and the side frame 39 hinged upwardly on the pins 41 and the link moved to engage the hook 30 with the aperture 32 in the gusset plate 33. The hook on the cable 4 is then connected with the link 25 whereby operation of the winch on the tractor 1 will raise the pipe cradle and the portion of the pipe adjacent same, said pipe compressing the cushioned rollers 52 as shown in Fig. 4. Movement of the tractor alongside of the trench carries the cradle therewith and due to the mounting of the cushioned rollers in the cradle it is comparatively free to move longitudinally along the surface of the pipe and provide cushioned roller support therefor, and as the pipe cradle moves along the pipe is raised sufficiently to permit removal of the timbers so the pipe will be gradually and progressively lowered into final position in the trench due to the forward movement of the tractor.

In the event of any relative lateral movement of the cradle and pipe, the sides of the pipe will engage the cushioned rollers 55, but at no time will the pipe or coating thereon come in contact with the metal members of the cradle. Therefore the pipe is supported and guided entirely by cushioned rollers which will not damage or mar the coating on the pipe. The cradle may be removed at any time from the string of pipe by lowering the cradle onto a suitable support whereby the hook 30 may be released from the aperture 32 in the gusset plate 33 permitting the side frame 39 to be hinged downwardly away from the pipe and the link 25 moved on the eye 26 whereby the entire cradle may be slipped from under the pipe.

It is believed obvious that I have provided a pipe cradle particularly adapted to support a string of pipe and be moved longitudinally thereof without marring or damaging the protective coating on said pipe as only cushioned rollers come in contact therewith.

What I claim and desire to secure by Letters Patent is:

1. In a pipe laying apparatus, a pipe supporting carriage comprising a frame, spaced pairs of rollers rotatably mounted on the frame for supporting the under surface of a pipe as the frame is moved longitudinally under same, upwardly extending posts on the frame, the posts on one side of the frame being hingedly mounted thereon for swinging movement away from the pipe carried on the rollers, means removably connecting the posts and adapted to be connected to a suspending means movable longitudinally of the pipe, and rollers rotatably carried by the posts for engaging the sides of the pipe to eliminate relative lateral movement of the pipe and frame.

2. In a pipe laying apparatus, a pipe supporting carriage comprising a frame, spaced pairs of cushioned rollers rotatably mounted on the frame for rolling engagement with the under surface of a pipe for supporting same as the frame is moved longitudinally under said pipe, upwardly extending posts on the frame, means removably connecting the posts and adapted to be connected to a suspending means movable longitudinally of the pipe, shafts adjustably mounted on the posts for movement toward and away from the pipe, cushioned rollers rotatably mounted on the shafts for rolling engagement with the sides of the pipe to eliminate relative lateral movement of the pipe and frame, and resilient means on the shafts for permitting limited movement of the second named cushioned rollers longitudinally of the shafts.

3. In a pipe laying apparatus, a pipe supporting carriage comprising a frame, spaced pairs of cushioned rollers rotatably mounted on the frame for rolling engagement with the under surface of a pipe for supporting same as the frame is moved longitudinally under said pipe, upwardly extending posts on the frame, the posts on one side of the frame being fixed thereto, the posts on the other side of the frame being hingedly mounted thereon for swinging movement away from the pipe carried on the cushioned rollers, means removably connecting the posts and adapted to be connected to a suspending means movable longitudinally of the pipe, shafts adjustably mounted on the posts for movement toward and away from the pipe cushioned rollers rotatably mounted on the shafts for rolling engagement with the sides of the pipe to eliminate relative lateral movement of the pipe and frame, and resilient means on the shafts for permitting limited movement of the second named cushioned rollers longitudinally of the shafts.

4. In a pipe laying apparatus, a pipe supporting carriage comprising a frame, spaced pairs of hubs rotatably mounted on the frame, pneumatic tires on the hubs for rolling engagement with the under surface of a pipe for supporting same as the frame is moved longitudinally under said pipe, upwardly extending posts on the frame, the posts on one side of the frame being fixed thereto, the posts on the other side of the frame being hingedly mounted thereon for swinging movement away from the pipe carried on the tires, means removably connecting the posts and adapted to be connected to a suspending means movable longitudinally of the pipe, shafts adjustably mounted on the posts for movement toward and away from the pipe, hubs rotatably mounted on the shafts, pneumatic tires mounted on said second named hubs for rolling engagement with the sides of the pipe to eliminate relative lateral movement of the pipe and frame, and resilient means on the shafts for permitting limited movement of the second named hubs longitudinally of the shafts.

5. In a pipe laying apparatus, a pipe supporting carriage comprising a substantially rectangular frame having spaced side and end members, spaced transverse shafts, bearing means secured to the side members of the frame for rotatably mounting said transverse shafts, spaced pairs of rollers fixed to the respective transverse shafts between the side members of the frame for rolling engagement with the under surface of the pipe for supporting same as the frame is moved longitudinally under said pipe, upwardly extending side frames carried by the side members of the frame, means removably connecting the side frames and adapted to be connected to a suspending means movable longitudinally of the pipe, vertically spaced brackets on the respective side frames, shafts releasably secured to said brackets, rollers rotatably and slidably mounted on said shafts for rollingly engaging the sides of a pipe to eliminate relative lateral movement of the pipe and frame, and a plurality of resilient members for resiliently supporting the second named rollers in adjusted position on said shafts.

6. In a pipe laying apparatus, a pipe supporting carriage comprising a substantially rectangular frame having spaced side and end members, spaced transverse shafts, bearing means secured to the side members of the frame for rotatably mounting said transverse shafts, spaced pairs of hubs fixed to the respective transverse shafts between the side members of the frame, pneumatic tires on said hubs adapted for rolling engagement with the under surface of the pipe for supporting same as the frame is moved longitudinally under said pipe, upwardly extending side frames carried by the side members of the frame, means removably connecting the side frames and adapted to be connected to a suspending means movable longitudinally of the pipe, vertically spaced brackets on the respective side frames, vertical shafts releasably secured to said brackets and adjustable laterally of the frame for various sized pipes, hubs rotatably and slidably mounted on said vertical shafts, pneumatic tires on said second named hubs for rollingly engaging the sides of a pipe to eliminate relative lateral movement of the pipe and frame, and a plurality of resilient members sleeved on the vertical shafts for resiliently supporting the second named hubs in vertically adjusted position.

7. In a pipe laying apparatus, a pipe supporting carriage comprising a substantially rectangular frame having spaced side and end members, spaced transverse shafts, bearing means secured to the side members of the frame for rotatably mounting said transverse shafts, spaced pairs of hubs fixed to the respective transverse shafts between the side members of the frame, pneumatic tires on said hubs adapted for rolling engagement with the under surface of the pipe for supporting same as the frame is moved longitudinally under said pipe, upwardly extending side frames carried by the side members of the frame, one of said side frames being hingedly mounted on the respective side member for swinging movement away from a pipe carried on the pneumatic tires, means removably connecting the side frames and adapted to be connected to a suspending means movable longitudinally of the pipe, vertically spaced brackets on the respective side frames, vertical shafts releasably secured to said brackets and adjustable laterally of the frame for various sized pipes, hubs rotatably and slidably mounted on said vertical shafts, pneumatic tires on said second named hubs for rollingly engaging the sides of a pipe to eliminate relative lateral movement of the pipe and frame, and a plurality of coiled springs sleeved on the vertical shafts for resiliently supporting the second named hubs in vertically adjusted position.

8. In a pipe laying apparatus, a pipe supporting carriage comprising an elongated frame, a plurality of rollers rotatably mounted on the frame and spaced longitudinally thereof for supporting the under surface of a pipe as the frame is moved longitudinally under same, upwardly extending posts on the frame, the posts on one side of the frame being hingedly mounted thereon for swinging movement away from the pipe carried on the rollers, means removably connecting the posts and adapted to be connected to a suspending means movable longitudinally of the pipe, and rollers rotatably carried by the posts and arranged longitudinally of the frame for engaging the sides of the pipe at spaced points longitudinally thereof to eliminate relative lateral movement of the pipe and frame.

STEPHEN A. BERGMAN.

REFERENCES CITED

The following references are of record in the file of this patent:

UNITED STATES PATENTS

| Number | Name | Date |
|---|---|---|
| 1,861,113 | Coberly | May 31, 1932 |
| 1,877,974 | Robb | Sept. 20, 1932 |
| 1,877,975 | Robb | Sept. 20, 1932 |